Jan. 19, 1926.  
C. J. PATTERSON  
ROAD EQUALIZER  
Filed June 13, 1924
1,570,522
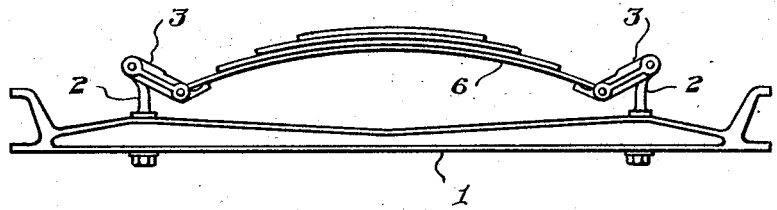
Fig. 1.
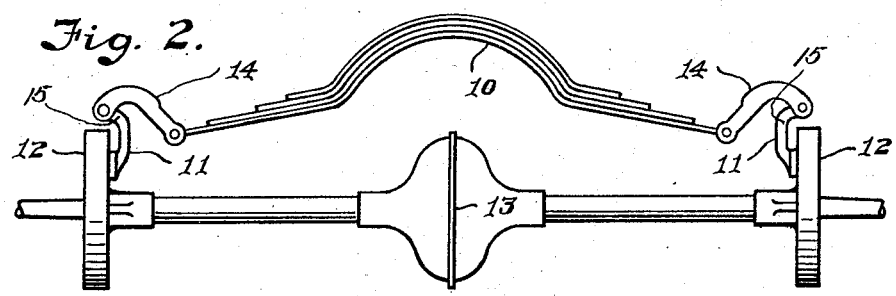
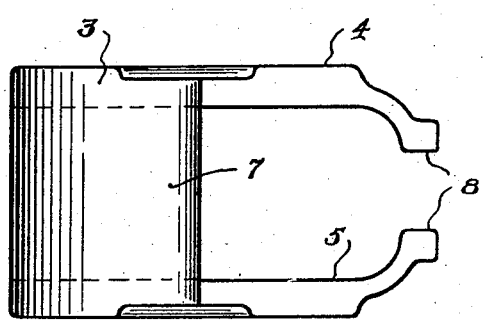
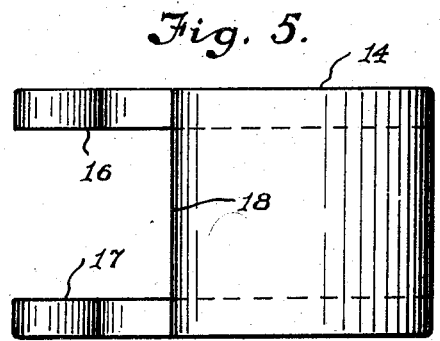
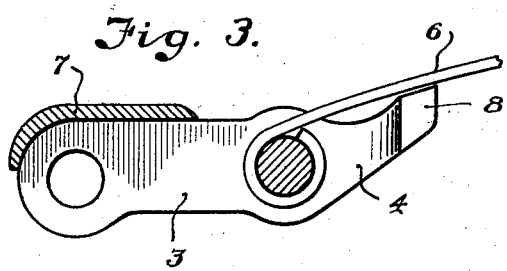
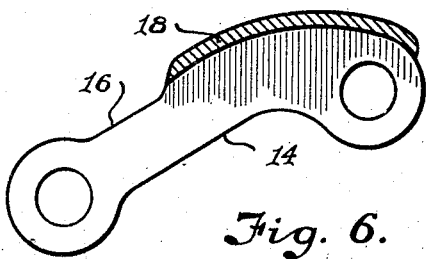
Chester J. Patterson  
INVENTOR
BY Victor J. Evans  
ATTORNEY Patented Jan. 19, 1926.

1,570,522

UNITED STATES PATENT OFFICE.

CHESTER J. PATTERSON, OF LANCASTER, PENNSYLVANIA.

ROAD EQUALIZER.

Application filed June 13, 1924. Serial No. 719,850.

*To all whom it may concern:*

Be it known that I, CHESTER J. PATTERSON, a citizen of the United States, residing at Lancaster, in the county of Lancaster and State of Pennsylvania, have invented new and useful Improvements in Road Equalizers, of which the following is a specification.

This invention relates to an attachment for motor vehicles, preferably as what is commercially known as the "Ford" type, and an object of the invention is to provide novel structures for supporting the ends of the laminated or leaf springs so as to permit the vehicle to adapt itself to irregularities in the road surface over which it is traveling and maintain the body of the vehicle in substantially horizontal position, the said devices also serving as shock absorbers, in that their particular mounting and movement, in combination with the action of the springs, will materially retard the distribution of shocks caused by undulations in the road surface.

A further object of the invention is to provide a vehicle attachment as specified which, besides compensating for unevenness in the road surface, will facilitate the steering of the vehicle in that it will prevent, to a material extent, lateral displacement of the body and cross rods of the vehicle when the latter strikes an uneven place in the road or is traveling over an uneven or irregular surface.

A further object of the invention is to provide an attachment as specified which, owing to its co-operation with the rear springs of the vehicle will cause it to ride with approximately the same ease with a light load as well as with a heavy load, and also to provide in the devices used in conjunction with the front vehicle spring, snubber extensions which will prevent the administering of quick abrupt movements or shocks to the vehicle body through the springs.

Other objects of the invention will appear in the following detail description, and in the accompanying drawings wherein:

Figure 1—is a front elevation of the front axle of a motor vehicle showing the improved attachment applied thereto.

Figure 2—is a rear elevation of the rear axle and spring structure of a motor vehicle showing the particular construction of the equalizer applied thereto.

Figure 3—is a top plan of the equalizers as used in connection with the front springs.

Figure 4—is a vertical section through the equalizers as used with the front vehicle springs.

Figure 5—is a top plan of the type of equalizer used with the rear vehicle spring.

Figure 6—is a vertical section through the type of equalizer used with the rear spring of the vehicle.

Referring more particularly to the drawings 1 indicate the front axle of the motor vehicle of the "Ford" type which has perches 2 attached thereto adjacent to its ends in the usual manner. The upper ends of the perches 2 curve outwardly towards the ends of the axle and they have the suspension members 3 pivotally connected thereto, and extending inwardly and downwardly from their points of connection with the perches. The suspension members 3 comprise spaced side bars 4 and 5 which engage on opposite sides of the front leaf spring 6 of a motor vehicle, to which spring they are pivotally connected. An apron 7 overhangs the space between the side bars 4 and 5 for a short distance downwardly from their pivot point and serves as a guard to prevent the accumulation of mud or foreign matter in the space between the links. The inner ends of the side bars 4 and 5 are extended and curved inwardly and upwardly as shown in Figures 1 and 3 of the drawings, forming snubber points 8 which extend beneath the spring 6 and act as snubbers to prevent the administering of sharp abrupt shocks to the vehicle body through the spring.

Owing to the particular construction of the rear axle and spring structure of motor vehicles of the type above mentioned, it is necessary to provide a different form of equalizer for use in connection with the rear spring 10.

This particular type of equalizer includes perches 11 which are attached to the brake housings 12 of the rear axle structure 13. The suspension members 14 are arcuate and present their convex edges upwardly and inwardly as clearly shown in Figure 2 of the drawings. The suspension members 14 are pivoted at their outer ends to the outwardly extending arms 15 on the perches 11 and they include spaced side bars 16 and 17, which are connected by an apron 18 which extends inwardly for a part of the length of the bars 16 and 17. The inner lower ends of the suspension members 14 are pivotally connected to the ends of the spring 10 to establish yieldable connection between the equalizers and springs and the axle structures, thereby permitting relative movements of the axle structures and springs through a comparatively great scope to compensate or equalize unevenness in the surface of the roadway over which the vehicle is traveling, and also to equalize the spring action, irrespective of the weight of the load on the vehicle, so that the vehicle will ride substantially as easy for one person as for five. The compensation of the spring action under various loads is caused by the relative positions assumed between the spring 10 and equalizers under different pressures upon the spring. The compensating action of the springs is permitted by the lengthening of the springs in proportion to the pressure applied thereto, and this lengthening, together with the downward pivotal movement of the equalizers, permits the absorbing of the shocks before they are delivered to the body of the vehicle.

The angles of inclination of the equalizers carried by the front axles of the vehicle are such as to impart yieldable rigidity to the body and to the cross rods and steering structures of the vehicle for stabilizing these parts and rendering vehicle easier to steer when traveling over uneven surfaces.

It is, of course, to be understood, that the invention may be constructed in various other manners and the parts associated in different relations, and therefore, I do not desire to be limited in any manner, except as set forth in the claims hereunto appended.

What I claim is:

1. The combination with a motor vehicle including axles and body supporting springs of equalizers for equalizing the action of uneven road surfaces, comprising perches, rigidly carried by the axle structure, suspension members pivotally carried by the perches and normally extending inwardly and downwardly from their points of connection with the perches, the inner lower ends of said suspension members being pivotally connected to the vehicle springs, certain of said suspension members having laterally curved snubber extensions on their free ends extending beneath the adjacent portions of the springs.

2. The combination with a motor vehicle including axles and body supporting springs, of equalizers for equalizing the action of uneven road surfaces comprising perches rigidly carried by the axle structure, suspension members pivotally carried by the perches and normally extending inwardly and downwardly from their points of connection with the perches, said suspension members including side bars pivotally connected at their lower ends to the vehicle springs, and an apron connecting said side bars for overhanging the connection between the suspension members and said perches and extending downwardly towards the connection of the arms and spring to form a guard, said suspension members having laterally curved snubber extensions on their upper ends extending beneath the adjacent portions of the springs.

In testimony whereof I affix my signature.

CHESTER J. PATTERSON.